Figure 1:
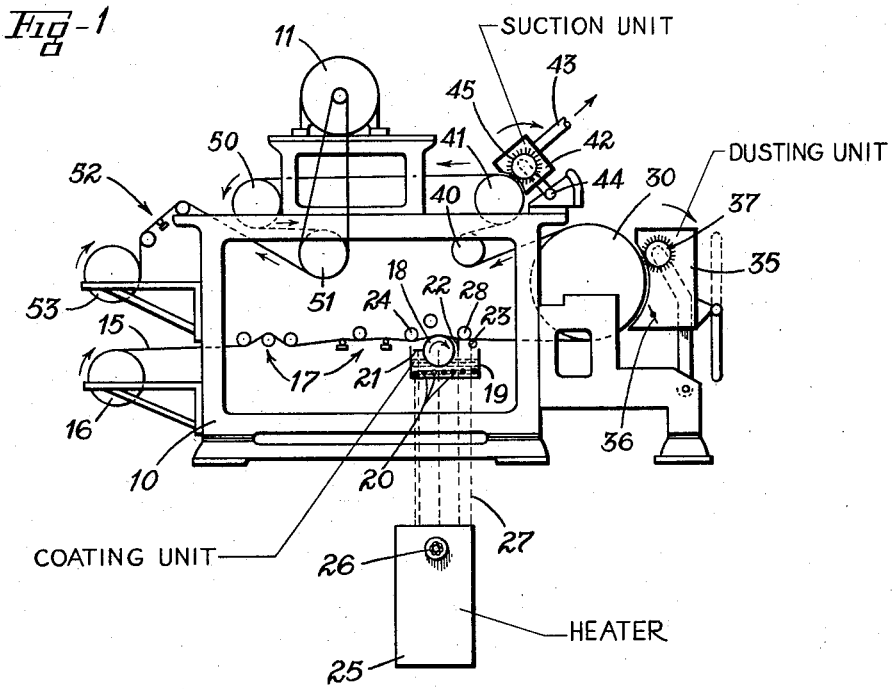

Patented May 11, 1954

2,678,284

UNITED STATES PATENT OFFICE 2,678,284

METHOD OF PRODUCING A THERMOPLASTIC ADHESIVE AND PRODUCT THEREOF

Frederick W. Holt, Jr., Troy, Ohio, assignor to The Brown-Bridge Mills, Inc., Troy, Ohio, a corporation of Ohio Application June 24, 1949, Serial No. 101,060

12 Claims. (Cl. 117—33)

This invention relates to heat sensitive or thermoplastic materials, usable as adhesives or the like, and more particularly to the production of sheets or webs of paper or the like having thermoplastic adhesive films applied thereto and to the causing of the tacky or adhesive applied thermoplastic films to set or harden almost instantaneously into solid or non-tacky condition and to remain in such solid or non-tacky condition at temperatures normally encountered in handling, shipping and storage thereof.

I have discovered that compositions suitable for use as heat sensitive or thermoplastic adhesives may be produced to possess the inherent characteristic of remaining persistently tacky or adhesive for a predetermined substantial period after having been melted or softened or rendered adhesive by heat and even after having cooled to a temperature substantially below that at which they initially became tacky or adhesive or molten and, furthermore, that such compositions, notwithstanding their inherent tendency to remain or persist in a tacky or adhesive condition, may be caused to set or harden almost instantaneously into a temporary solid or substantially non-tacky condition and to remain in such temporary condition until their inherent characteristic of persistent tackiness is once again restored by the application of heat. Compositions of the character described suitable for use as heat sensitive or thermoplastic adhesives possessing the inherent characteristic of remaining persistently tacky or adhesive for a substantial period after having been melted or softened or rendered adhesive by heat are useful, for example, as adhesive coatings to be applied to sheets or webs of paper or the like for use as thermoplastic adhesive coated labels or sealing tapes. In the application, however, of such adhesive compositions possessing the inherent characteristic of remaining persistently tacky to sheets or webs of paper this very characteristic of remaining persistently tacky is objectionable because of resultant sticking together of such adhesive coated sheets or webs when stacked or rolled upon themselves for storage or shipment and in the practicing of the invention hereof the adhesive composition is so treated as to cause temporary change from its persistently tacky condition to a solid or substantially non-tacky condition. Such temporary change should, however, be made in such a manner that the useful adhesive properties of the composition are not impaired and so that the tacky or adhesive characteristics of the composition may be restored when it is desired to use the adhesive coated sheets or webs for labeling or sealing purposes.

Thus, if heat sensitive or thermoplastic adhesive compositions of the character described are applied to a paper sheet or web as a film in a molten condition, or if such films are applied from a solution in a suitable solvent or dispersion in a suitable dispersion medium or vehicle, the heating operation necessary to render the thermoplastic adhesive composition molten, or necessary to eliminate the solvent or vehicle from the film, will instigate the inherent characteristic of remaining persistently tacky and the immediate stacking or rolling of the paper sheets or webs with the adhesive film thereon will be prevented, thus prolonging the manufacturing operation, delaying the time at which the adhesive coated sheet or web product may be stored or shipped, and making necessary complicated or wastefully extensive storage or drying means by which the adhesive coated sheets or webs may be spread out or "festooned" until such time as the adhesive film thereon may set or harden sufficiently to admit the coated sheets or webs being stacked or rolled upon themselves.

In accordance with the present invention it has been discovered that heat sensitive or thermoplastic compositions suitable for use as adhesives or the like and possessing the inherent characteristic of remaining persistently tacky or adhesive for a substantial period after having been melted or rendered adhesive, such compositions containing as one constituent thereof a so-called plasticizing material, may be applied as adhesive or tacky films to labeling or sealing materials and, notwithstanding the inherent tendency of such compositions to persist in a tacky or adhesive condition after being so applied, may be caused rapidly to set or harden into a substantially non-tacky or non-adhesive condition by proper addition thereto of some of the same plasticizing material as is contained in such heat sensitive thermoplastic adhesive compositions, with the additional plasticizing material satisfactorily being added in relatively small amount and in the form of finely divided solid particles.

It is one of the principal objects of this invention to provide a method, in the production of traveling webs of paper having an applied heat sensitive or thermoplastic adhesive film thereon, in which the adhesive material in fluent and tacky condition is applied to the traveling web, by a suitable coating means to form a layer or film, and, while in such applied state and persisting as a viscous or fluent, tacky, film, is then treated with a small quantity of one of its dominant constituents in solid powdered form to cause a substantially immediate change from the fluent or molten or tacky condition to set said applied heat sensitive or thermoplastic material into a solid condition so that it will remain, as a thermoplastic adhesive film, in such solid condition at temperatures substantially above those normally encountered in shipping, storing and handling.

It is another object of this invention to provide a method, in the production of traveling webs of paper having an applied heat sensitive or thermoplastic adhesive film thereon, in which the adhesive material in fluent and tacky condition is applied to the traveling web by suitable coating means and, while in such applied state as a film and, while in such applied state as a viscous or fluent and persistently tacky film, is treated with a small quantity of one of its dominant thermoplastic constituents in solid powdered form to cause a substantially immediate change in the fluent or tacky condition to set said heat sensitive or thermoplastic film into a temporary solid condition so that it will remain in such solid condition at temperatures substantially above those normally encountered in shipping, storing and handling, but which on subsequent heating will become softened to a tacky or adhesive condition which will persist for a long period substantially as if the adhesive film had not been set to such temporary solid condition.

Another object of the invention is to provide a method in the producing of a non-tacky film of heat sensitive or thermoplastic adhesive material which material is particularly adapted for application as an adhesive film to a sheet or continuous web of paper or the like using sheet or web coating apparatus of simple construction and operational characteristics, which method effects a change in the inherently persistent tacky condition of such adhesive material to produce a non-tacky film or coating on the sheet or web within a sufficiently short interval after initial application of the persistently tacky material to the sheet or web to permit continuous operation of the apparatus at substantial speed and to permit the coated sheet or web to be rolled or stacked on itself as delivered by the coating apparatus, without sticking to itself or to the apparatus.

It is additionally an object of this invention to provide a method of rapidly setting into non-tacky or non-adhesive consistency a fluent or viscous tacky or adhesive heat sensitive or thermoplastic material containing as one constituent therein a plasticizing material normally solid at room temperatures, by the addition to such tacky thermoplastic material of a small quantity of the same plasticizing material which is already present therein, with the additional plasticizing material being added in finely divided solid form and without substantially changing the adhesive or thermoplastic characteristics of such material when again rendered tacky or adhesive by the application of heat.

Another object of the invention is to provide a method of treating a fluent or molten resinous material which is heat sensitive or thermoplastic to cause substantially immediate setting thereof into a solid or non-fluent and non-tacky consistency by causing a temporary change in its condition without substantial change in its composition or in its adhesive and thermoplastic characteristics, such material when thus set having thermoplastic characteristics and being readily changeable by heat into a fluent or tacky condition to serve as an adhesive when heated to a temperature above that normally encountered in the handling, shipping or storing of such material prior to such heating.

Another object of the invention is to provide a method of forming a non-tacky film of thermoplastic adhesive material by depositing the film on a supporting surface in fluent or molten tacky condition, said material being of such composition that said molten or tacky condition tends to persist for extended periods of time at room temperature in the absence of modifying conditions, and thereafter effecting rapid setting or hardening of the film into temporary non-tacky condition to admit of rolling or stacking the film or the materials to which the film may be applied without danger of the film sticking to itself or to the supporting material therefor, such temporarily set or hardened film when remelted returning to its original molten or fluid tacky condition and tending to persist therein substantially as when unmodified.

An additional object of this invention is to provide a method of quickly and easily producing a non-tacky film of thermoplastic adhesive material containing as one constituent a plasticizer normally solid at room temperature wherein the adhesive is initially applied in a molten or fused condition to form a film and is then chilled substantially below the temperature at which it was applied to a condition of viscous persistent tackiness and is then caused to set substantially instantaneously from such persistent tacky condition to a non-tacky condition by the addition thereto of a small quantity of the same plasticizing material which is already present in the film, with the additional plasticizing material being added in finely divided solid form and effective to overcome the persistent tacky condition and to cause setting or hardening of the adhesive material to a solid non-tacky condition.

Other objects and advantages of the invention will be apparent from the following description, the appended claims and the accompanying drawing.

In the drawing—

Figure 2:
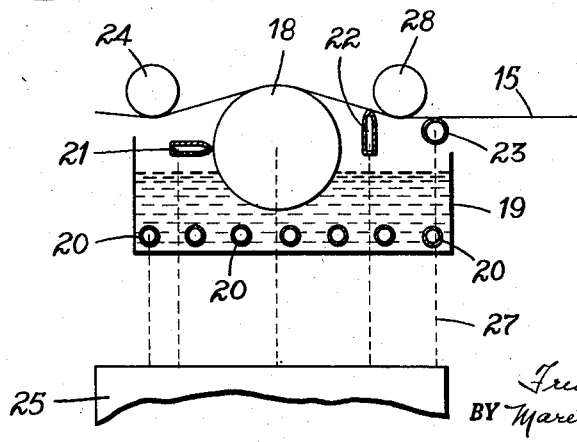

Fig. 1 illustrates, somewhat diagrammatically, a side elevational view of a form of apparatus found satisfactory for practicing, and for producing on a traveling web of paper, the non-tacky coating of heat sensitive or thermoplastic adhesive material of this invention; and Fig. 2 is an enlarged diagrammatic view of the coating unit of the apparatus of Fig. 1.

With reference to such preferred embodiment of apparatus of, and for practicing, the present invention, satisfactory results have been obtained in the production of commercial label paper with an adhesive coating substantially non-tacky at temperatures adequately above those normally encountered in the handling, shipping and storage of such label paper coated with heat sensitive or thermoplastic adhesive compositions, which include as one constituent a plasticizer normally solid at room temperature and which normally persist in a tacky condition for considerable or prolonged periods after having been softened by heat, and even after cooling to temperatures substantially below those at which such compositions initially became tacky, one such composition consisting of:

*Example I*

| | Parts |
|---|---|
| Rosin | 40 |
| Ethyl cellulose | 20 |
| Santicizer 3 | 40 |

In this example, the solid plasticizer may be the commercially well known product of Monsanto Chemical Company, Santicizer 3, which is understood to be and is generally described as essentially N-ethyl paratoluene sulfonamide. The rosin may be the usual commercial grades, and the ethyl cellulose the regularly available commercial grade. When these constituent parts are fused or melted together and thereafter caused to harden, they form a thermoplastic composition which is normally hard and non-tacky at room temperature, but which begins to soften at approximately 120° F. and becomes sufficiently fluid for a film forming or coating operation at temperatures above approximately 200° F.

Referring to the preferred embodiment of apparatus illustrated in the drawing, there is a suitable framework 10. A drive motor 11 is shown as mounted on the top of frame 10 and drives the several driven rolls and brushes of the apparatus through suitable gears or chains and sprockets. A paper web 15 is shown as passing from a supply roll 16 through a series of guiding and tensioning rolls 17 to a coating unit comprising a driven roll 18 suitably heated as by the circulation of preheated oil therethrough which dips into the molten thermoplastic adhesive material contained in reservoir 19 and applies a desired film of the molten adhesive material to web 15. Reservoir 19 may be provided with suitable heating means indicated diagrammatically at 20 (which may satisfactorily comprise pipes for the circulation of heated oil through reservoir 19) for maintaining the molten adhesive composition therein at a temperature sufficiently high to assure a state of free flowing of the molten thermoplastic adhesive material. Satisfactory results are obtained with said adhesive material in reservoir 19 at a temperature of approximately 250° to 275° F.

The amount of coating applied as a film by roll 18 is controlled by doctor blades 21 and 22 and smoothing roll 23. Doctor blade 21 is adjustably mounted adjacent coating roll 18 so as to limit the amount of molten material picked up by coating roll 18 from reservoir 19 which is carried up against and applied to the surface of the traveling web, and by suitable adjustment a proper controlled excess of the fluent adhesive material is carried by roll 18 against and applied to web 15. To avoid possible accumulation of hardened adhesive material on doctor blade 21, it is suitably heated as by being hollow and having preheated oil circulated through the hollow blade. Doctor blade 22 is adjustably mounted and preferably heated. As shown diagrammatically this doctor is hollow for circulation of heated oil which is heated to a temperature controlled according to the composition and characteristics of the material on the web, and the web is tensioned against the heated edge of this blade, by adjustment of the blade with respect to the roll 18, to remove the desired excess and leave the desired film of fluent adhesive material on the web.

After passing the doctor blade 22, the coating on web 15 is smoothed or spread, to give desired uniformity, by the smoothing and spreading roll 23. This spreading roll is also preferably heated, as by hot oil circulated therethrough, as indicated diagrammatically, and the web with the proper amount of applied fluent adhesive film passes against the smoothing and spreading roll 23 under tension of the web according to adjustment of this roll with respect to the positioning of the roll 18 and doctor blade 22 and adjustable control rolls 24 and 28. Substantial differential speed as between the web with its applied molten or fluent material and the smoothing and spreading roll 23 is established to accomplish the smoothing and spreading action.

The spreading roll 23 is shown as a hollow pipe or tube, which may be journaled on the frame 10 with suitable means for driving roll 23 at controlled speed. Satisfactory results have been secured with the formulations herein set out with this spreading roll turning in the direction of paper travel but at a peripheral speed much slower than paper speed, for example a speed ratio of about 1:10 to 1:20. This roll 23 may be turned against the direction of travel of the web, and the speed adjusted readily to give adequate smoothing and distribution of the coating. As shown the pan or trough 19 preferably has an extended lip to catch any fluent coating which may be doctored off by the roll 23.

Suitable heating means for the tank 19, the roll 18, the doctor blades 21 and 22 and the spreading roll 23 may be provided, such as the hot oil mentioned. As shown diagrammatically a hot oil heater 25 is provided, having suitable thermostat control 26, and connected by circulating pipes illustrated by dotted lines 27 and connected to the parts designated, or other parts to be heated.

The adhesive coating is thus applied to web 15 in a molten condition and thereafter the web is passed over a large diameter driven cooling roll 30 to chill the coating to a temperature substantially below the original melting temperature of the molten adhesive composition and to quickly change the molten film to a viscous or tacky condition, the untreated side of the web passing against the chilling roll surface. Satisfactory operations have been secured with the chilling roll 30 at a temperature of approximately 55° F. This temperature may be satisfactorily maintained by the circulation of cold water through roll 30. Driven rolls 40, 41, 50 and 51 may also satisfactorily be chilled to substantially the same temperature by the same means. It should be noted, however, that this chilling operation is not necessary in the practicing of this invention, satisfactory results having been obtained without chilling the applied film. With some more fluent adhesive compositions, however, suitable chilling may be found convenient.

Notwithstanding the sudden drop from the temperature of about 250° F. at the applying roll 18 as caused by the 55° F. at the chilling roll 30, the thermoplastic adhesive film applied to web 15 will not thereby be set or hardened into solid, non-tacky condition, but, because of its characteristic of persistent tackiness due to its constituents and formulation, will rather remain in a tacky condition for a considerable period, a thermoplastic adhesive film which for example is approximately 0.0005 inch in thickness, remaining in a viscous, tacky condition for minutes or hours or even days depending upon its composition. However, it has been found, under this invention, possible to effect quick conversion of this tacky film to a substantially non-tacky, or non-"blocking," condition almost immediately to permit of rolling or stacking of the coated web without sticking to itself. To effect this the surface of the tacky film, applied to web 15, is dusted with some of the same plasticizer, in finely divided solid form, which is already present in molten or fluent, tacky, state in the film. As shown in the drawing, the dusting unit includes a hopper 35 mounted adjacent the chilling roll 30. This hopper is filled with finely divided plasticizer for application to the coated surface of the web 15 as it passes over roll 30; and when a small percentage of the solid plasticizer material dust is thus distributed and brought upon the tacky film there is this astonishing, almost immediate, change from the tacky condition, inherently tending to persist, to a modified or temporary state wherein the film sets up as a solid and non-tacky thermoplastic film.

Satisfactory results are obtained with the composition given above in Example I if the hopper 35 contains the plasticizer Santicizer 3 in finely divided powdered form, for example with most of the particles of a size not substantially greater than approximately 10 microns. It may be noted that, if the plasticizer should tend to lump when being powdered, a small quantity of a suitable "flatting" agent (which prevents the powdered material from agglomerating) may be added, satisfactory results having been obtained by adding to the powdered Santicizer 3 contained in hopper 35 approximately 10% by weight of Santocel, a product of Monsanto Chemical Company composed primarily of silicon dioxide in powdered form.

A rotating paddle 36 in hopper 35 throws the powdered plasticizer on to the adhesive coated surface of web 15 as it passes over roll 30, and a rotary brush 37 is mounted in hopper 35 and is driven in the opposite direction from the direction of travel of the web 15 on roll 30 to aid in dispersing the plasticizer dust uniformly over the whole area of the chilled viscous tacky film on web 15, and to help insure adequate intimacy of the dust and the surface zone of the coating film.

The coated and dusted web 15 passes from roll 30 over a guide roll 40 to another roll 41 adjacent to which is positioned a vacuum box 42 having a suitable suction pipe 43. Vacuum box 42 is mounted at 44 for swinging movement toward and away from roll 41. Within vacuum box 42 is a rotary brush 45 which is also driven in the opposite direction from the direction of travel of the web 15 on roll 41. This brush further aids in dispersing the plasticizer dust over the adhesive film and insuring the intimacy of relationship, and any superfluous plasticizer dust remaining on the surface of the film is removed by the suction from suction pipe 43. From roll 41 the web 15 passes over additional rolls 50, 51 and 52 to rewind roll 53.

Notwithstanding the inherent characteristic of the composition of Example I to persistently remain in a tacky condition for a substantial period after having been melted and even after having been chilled, when the chilled film is dusted as described with the same plasticizer which is already present therein, it will set or harden substantially instantaneously into a hard and non-tacky film. Thus for example, in using the composition of Example I with the coating apparatus as described, a non-tacky film has been obtained on the web of paper with the web traveling through the coating apparatus at a rate of approximately 150 feet per minute when the total distance of travel from the chilling roll 30 to the wind-up roll 53 is about 20 to 25 feet. Under these conditions, the paper web with thermoplastic adhesive film thereon is rolled on itself within only about 10 to 15 seconds after application of the molten film thereto and without sticking to itself when so rolled.

The hardened non-tacky coating produced on the web as thus described has a translucent or flat finish, or a somewhat milky appearance, and the constituents appear to be in solid solution. When this film is subsequently heated to a temperature high enough to remelt it, it again exhibits substantially the same appearance and thermoplastic and adhesive properties as the film of the same composition which was originally applied in molten or fluent condition and then quickly set by the dusting treatment. I. e., it appears like a clear or transparent liquid, and will remain in a viscous and sticky or tacky condition for a prolonged period, notwithstanding that the film has been chilled to a temperature as low as 55° F. If, however, additional finely divided plasticizer be dusted onto the re-melted, tacky film, again it will harden or set and become non-tacky within a few seconds just as it did when first applied to the web and dusted. Similarly, the non-tacky film produced by the above method as described has substantially the same melting temperature range as a film of the same composition hardened without dusting except that very slight temperature variations may occur, and this may be a result of the slight variation in composition due to the small amount of additional plasticizer therein as compared with the original composition. If such changes in melting range do occur, the altered temperatures remain the same throughout subsequent heating and setting of the coating.

It has been found that almost immediate setting or hardening of the film of the composition of Example I may satisfactorily be secured using amounts of plasticizer dust as low as 3% by weight of the original plasticizer content of the film. This amount may vary substantially and may be affected by the degree of softness or stiffness of the particular composition being used under the conditions of a given film forming operation. There appears to be considerable mechanical absorption of the powdered plasticizer by the film with relatively softer films taking up a higher percentage of dust than stiffer films. It does not, however, appear that the amount of dust used is critical in causing the setting or hardening of the film but rather that it is necessary to apply only sufficient dust so that the particles thereof will upset the internal mechanics of the viscous fluent film sufficiently to cause it to change into solid or substantially non-tacky condition. Accordingly it appears unnecessary to attempt to meter the amount of dust applied, any excess being removed by the suction unit as described, and it appears more convenient to hasten the setting process by assuring complete coverage of the entire area of the film by applying excess plasticizer dust thereto. Although in the above example adequate rapid setting of the film immediately after application to the web is obtained with only about 3% added plasticizer, this figure may in some cases rise as high as 20% with other suitable adhesive compositions. It has also been noted that, although the thermoplastic and adhesive properties of a given adhesive composition apparently depend upon the total amount of plasticizer present, substantially the same amount of added plasticizer dust will cause the desired setting of films varying widely in initial plasticizer content except to the extent that the amount of added plasticizer taken up by the film may vary with the stiffness or softness of the film.

This method of rapidly producing a non-tacky film of thermoplastic adhesive has been practiced satisfactorily also with materials of other and differing compositions or formulations, the following being illustrative examples of other compositions so used:

*Example II*

|  | Parts |
|---|---|
| Polyvinyl butyral L. V. | 120 |
| Polypale resin (polymerized rosin) | 100 |
| Santicizer 3 | 450 |

*Example III*

|  | Parts |
|---|---|
| Polyvinyl butyral L. V. | 120 |
| Lewisol 28 (maleic alkyd modified rosin ester) | 100 |
| Hercolyn (hydrogenated methyl abietate) | 100 |
| Santicizer 9 (mixture ortho and paratoluene sulfonamides) | 450 |

*Example IV*

|  | Parts |
|---|---|
| Ethyl cellulose N 100 | 100 |
| Cumar V (coumarone-indene resin) | 450 |
| Santicizer 3 | 450 |

In carrying out the method described with each of the above three examples, the same temperatures given in connection with Example I have been found satisfactory. With Examples II and IV, the tacky coating is dusted with powdered Santicizer 3, and with Example III, powdered Santicizer 9 is used. It has also been found that, although these two plasticizers are relatively closely related in chemical structure, Santicizer 3 does not set a film of the material of Example III, nor will Santicizer 9 set a film of either of Examples I, II or IV. It has also been found that, if both of these plasticizers are present in the original composition in substantial or effective proportions, the resulting tacky film is not set by either plasticizer in powdered form or by a mere mechanical mixture of both plasticizers in powdered form. The plasticizer used as a constituent of the formulation thus has a dominant characteristic as to the powdered solid plasticizer dust in that so far as has been found with many compositions or formulations and many different dusting materials, satisfactory results in the practicing of this invention have been obtained when using a powdered plasticizer which is said dominant constituent of the formulation.

Other thermoplastic adhesive compositions with which the above method has been satisfactorily practiced include the following:

*Example V*

|  | Parts |
|---|---|
| Cellolyn 102 | 35 |
| Abitol | 12 |
| Ethyl cellulose N–50 | 9 |
| Triphenyl phosphate | 44 |

Cellolyn 102 is a modified rosin ester, and Abitol is hydroabietyl alcohol, both being products of Hercules Powder Company. This composition can be applied and set under approximately the same temperature conditions discussed in connection with Example I, with the tacky film being dusted with powdered triphenyl phosphate.

*Example VI*

|  | Parts |
|---|---|
| Dow plasticizer 7A | 75 |
| Ethyl cellulose N–50 | 25 |

Dow plasticizer 7A is tri(para tertiary-butylphenyl) phosphate, and this composition can also be applied and set as described in connection with Example I with the tacky film being dusted with powdered Dow plasticizer 7A.

*Example VII*

|  | Parts |
|---|---|
| Dicyclohexyl phthallate | 75 |
| Ethyl cellulose N–50 | 25 |

This composition can also be applied and set as described in connection with Example I by dusting the tacky film with dicyclohexyl phthallate in powdered form.

It will be noted that each of these compositions includes as the essential constituents thereof, a major proportion of a film-forming resin and a plasticizer which is normally solid at room temperature, and some examples also include an additional resin. Other suitable compositions may also include a waxy material. All of these examples will form upon heating a viscous tacky film which will normally remain tacky at room temperature for an extended period but which can be set practically instantaneously to non-tacky condition by dusting with the same plasticizer in finely divided form as described. The resulting non-tacky film in each case is thermoplastic and can be caused to display the desired adhesive characteristics by subsequent heating to a sufficiently elevated temperature to melt the temporarily set, solid and non-tacky film which will then exhibit substantially the same adhesive properties as the original composition before being set or hardened by dusting.

It appears that the rapid setting obtained by the method of the invention as described may result from or at least be analogous to a seeding action by the added finely divided plasticizer in a supercooled solution, but it should be noted that similar results have not been obtained when the chilled film is dusted with any other material than the same plasticizer already present therein, herein sometimes referred to as a dominant constituent. Furthermore, the above obtains even when using plasticizers which can be melted and supercooled in substantially pure condition and can then be successfully seeded and crystallized by dusting with a foreign material such as starch or the like.

It should also be noted that the method of the invention does not result in impairing the properties of the thermoplastic composition for use for adhesive purposes. Thus when a sticky film is dusted with an inert material such as starch or talc to form a non-tacky surface coating on the film, the result is to prevent use of the film for adhesive purpose until this coating has been removed, and if the inert material is employed to seed the film, it remains as a solid impurity which may interfere with the adhesive properties of the film. In contrast, the finely divided plasticizer which is added to the thermoplastic composition in carrying out the method of the present invention appears to become itself an integral part of the solid solution, and it remains as an integral part of the composition when the latter is subsequently heated to render it suitable for adhesive use.

The method of the invention is not limited in practice to adhesive films applied in a molten condition. Suitable thermoplastic adhesive films may be formed either by being deposited from a solution or from a dispersion, and if undesirable tackiness results, as from a heating operation used to eliminate the solvent or the dispersion medium after formation of the film, the film may be set into solid or non-tacky condition by dusting with the same plasticizer as is present in the film as already described. Also the method of this invention is not limited in practice to the application of adhesive coatings on web materials but is equally applicable to other uses of resinous compositions suitable for use as thermoplastic adhesives and otherwise. For example, the method may be employed in the application of such compositions as adhesives to portions of a paperboard box or box blank which are later to be caused to adhere together either to form or to seal the box. Thus a thermoplastic adhesive composition in molten form or in solution can be coated or spotted on the desired portions of the box and the resulting tacky film can then be rapidly set or hardened by dusting with the same finely divided plasticizer already present in the film. This method is accordingly well suited for rapid quantity production of such boxes or box blanks as well as with other articles or materials, as for example sealing tapes or the like with which it is desired to produce non-tacky films or other configurations of resinous heat sensitive or thermoplastic compositions.

It will accordingly be seen that the present invention greatly aids the use of thermoplastic materials by facilitating application of such materials where they are to be employed as preformed non-tacky films or coatings intended to be subsequently rendered tacky by heating for adhesive use. The method of the invention is accordingly admirably suited for use in the quantity production of coated webs or other adhesive coated articles and can be readily carried out as described by means of relatively simple and compact apparatus.

While the method herein described constitutes a preferred embodiment of the invention, it is to be understood that the invention is not limited to this precise method or apparatus, and that changes may be made therein without departing from the scope of the invention which is defined in the appended claims.

What is claimed is:

1. In a method of producing a thermoplastic adhesive film characterized by nontackiness at room temperature and by the property of becoming tacky upon heating thereof to a predetermined temperature higher than room temperature and remaining tacky for a substantial time interval following subsequent cooling to substantially room temperature and which comprises as the essential constituents thereof a major proportion of a thermoplastic resin and a specific thermoplastic plasticizer both having softening points higher than room temperature, the steps of forming on a supporting surface a fused film of said adhesive at a temperature higher than said softening points of said resin and said plasticizer, cooling said fused film to a lower temperature below said softening point of said plasticizer until said fused film becomes tacky, and applying to the resulting tacky cooled film a modifying substance consisting essentially of the same said specific plasticizer in finely divided solid form while maintaining said film at said lower temperature to cause substantially immediate setting of said tacky film to nontacky condition, said applied plasticizer being a minor fraction of the total amount of said plasticizer present in said fused film.

2. In a method of producing a thermoplastic adhesive film characterized by nontackiness at room temperature and by the property of becoming tacky upon heating thereof to a predetermined temperature higher than room temperature and remaining tacky for a substantial time interval following subsequent cooling to substantially room temperature and which comprises as the essential constituents thereof a major proportion of a thermoplastic resin and a specific thermoplastic plasticizer both having softening points higher than room temperature, the steps of forming on a supporting surface a fused film of said adhesive at a temperature higher than said softening points of said resin and said plasticizer, cooling said fused film to a lower temperature below said softening point of said plasticizer until said fused film becomes tacky, spreading on the surface of the resulting tacky cooled film a modifying substance comprising essentially the same said specific plasticizer in finely divided solid form and in an amount equal to a minor fraction of the total amount of said plasticizer present in said fused film, and mixing said solid plasticizer with said film while maintaining said film at said lower temperature to cause substantially immediate setting of said tacky film to nontacky condition.

3. In a method of continuously producing on a web a nontacky thermoplastic adhesive film characterized by maintaining said nontackiness at room temperature and by the property of becoming tacky upon heating thereof to a predetermined temperature higher than room temperature and remaining tacky for a substantial time interval following subsequent cooling to substantially room temperature and which comprises as the essential constituents thereof a major proportion of a thermoplastic resin and a specific thermoplastic plasticizer both having softening points higher than room temperature, the steps of continuously advancing said web while forming thereon a fused film of said adhesive at a temperature higher than said softening points of said resin and said plasticizer, cooling said fused film to a lower temperature at least substantially as low as room temperature until said fused film becomes tacky while continuing to advance said web, and applying to the resulting tacky cooled film a modifying substance containing as the active ingredients for said step the same said specific plasticizer in finely divided uncombined form while maintaining said film at said lower temperature to cause substantially immediate setting of said tacky film to nontacky condition, said modifying plasticizer being a minor fraction of the total amount of said plasticizer present in said fused film.

4. An adhesive coated material comprising a base web having thereon a thermoplastic adhesive film prepared by the method defined in claim 3.

5. In a method of producing a thermoplastic adhesive characterized by nontackiness at room temperature and by the property of becoming tacky upon heating thereof to a predetermined temperature higher than room temperature and remaining tacky for a substantial time interval following subsequent cooling to substantially room temperature and which comprises as the essential constituents thereof a major proportion of a thermoplastic resin and a specific thermoplastic plasticizer both having softening points higher than room temperature, the steps of fusing a quantity of said adhesive at a temperature higher than said softening points of said resin and said plasticizer, cooling said fused adhesive to a lower temperature below said softening point of said plasticizer until said fused adhesive becomes tacky, spreading on the surface of the resulting tacky cooled adhesive a small quantity of the same said specific plasticizer in finely divided uncombined solid form and in an amount equal to a minor fraction of the total amount of said plasticizer present in said fused adhesive, and mixing said solid plasticizer with said adhesive while maintaining said adhesive at said lower temperature to cause substantially immediate setting of said tacky adhesive to nontacky condition.

6. A thermoplastic adhesive composition prepared by the method defined in claim 5 and characterized by nontackiness at room temperature and by the property of becoming tacky upon heating thereof to a predetermined temperature higher than room temperature and of remaining tacky for a substantial time interval following subsequent cooling to below said predetermined temperature.

7. In a method of producing a nontacky film of thermoplastic adhesive material which has a predetermined softening temperature, which comprises as the essential constituents thereof a major proportion of a thermoplastic resin and a specific thermoplastic plasticizer each having a softening point higher than said softening temperature, and which is characterized by the property of becoming tacky upon heating above said softening temperature thereof and of remaining tacky for a substantial time interval following cooling to temperatures below said softening temperature, the steps of forming on a supporting surface a fused film of said adhesive at a temperature higher than said softening temperature thereof and said softening points of said resin and said plasticizer, cooling said fused film to a lower temperature below said softening temperature and said softening points until said fused film becomes tacky, and causing the resulting tacky cooled film to set substantially immediately to non-tacky condition by adding thereto a modifying substance containing as the essential ingredient thereof for said step the same said specific plasticizer in finely divided solid form.

8. A method of substantially immediately setting to nontacky consistency a film of thermoplastic adhesive which has a predetermined softening temperature higher than room temperature, which comprises as the essential constituents thereof a major proportion of a thermoplastic resin and a specific thermoplastic plasticizer each having a softening point higher than room temperature, which is characterized by the property of becoming tacky upon heating above said softening temperature thereof and of remaining tacky for a substantial time interval following cooling to temperatures below said softening temperatures, and which has been heated to fused consistency and then caused to cool to a lower temperature below said softening temperature and said softening points of said resin and said plasticizer until said fused film becomes tacky, said method being composed of the steps of spreading on the surface of said tacky film a modifying substance containing as the essential ingredient thereof for said step the same said specific plasticizer in finely divided solid form, mixing said solid plasticizer with said film while maintaining said film at said lower temperature to cause substantially immediate setting of said tacky film to nontacky consistency, and thereafter effecting removal from the surface of said film of the excess of said solid plasticizer not involved in initiating and effecting said setting action.

9. A method of substantially immediately setting to nontacky consistency a film of thermoplastic adhesive which has a predetermined softening temperature higher than room temperature, which comprises as the essential constituents thereof a major proportion of a thermoplastic resin and a specific thermoplastic plasticizer each having a softening point higher than room temperature, which is characterized by the property of becoming tacky upon heating above said softening temperature thereof and of remaining tacky for a substantial time interval following cooling to temperatures below said softening temperatures, and which has been heated above said softening temperature thereof to fused consistency, said method being composed of the steps of cooling said fused film to a temperature below said softening temperature thereof and said softening points of said resin and said plasticizer until said fused film becomes tacky, spreading on the surface of the resulting tacky cooled film a modifying substance containing as the essential ingredient thereof for said step the same said specific plasticizer in finely divided solid form, and mixing said solid plasticizer with said film while maintaining said film at said lower temperature.

10. In a method of producing a thermoplastic adhesive film characterized by nontackiness at room temperature and by the property of becoming tacky upon heating thereof to a predetermined softening temperature higher than room temperature and remaining tacky for a substantial time interval following subsequent cooling to below said softening temperature, the steps of forming a hot melt comprising as the essential constituents thereof a major proportion of a thermoplastic resin and a specific thermoplastic plasticizer each having a softening point higher than room temperature, applying a film of said hot melt to a supporting surface, cooling said film to a lower temperature below said softening temperature of said adhesive and said softening point of said plasticizer until said film becomes tacky, and applying to the resulting tacky cooled film a modifying substance comprising essentially the same said specific plasticizer in finely divided solid form while maintaining said film at said lower temperature to cause substantially immediate setting of said tacky film to nontacky condition.

11. In a method of producing a thermoplastic adhesive film characterized by non-tackiness at room temperature and by the property of becoming tacky upon heating thereof to a predetermined softening temperature higher than room temperature and remaining tacky for a substantial time interval following subsequent cooling to below said softening temperature, the steps of forming a solution comprising as the essential constituents thereof a solvent and a major proportion of a thermoplastic resin and a specific thermoplastic plasticizer each having softening points higher than room temperature, applying a film of said solution to a supporting surface, heating said film to a temperature higher than said softening temperature of said adhesive until said solvent has been eliminated therefrom and said resin and said plasticizer are fused together, cooling said fused film to a lower temperature below said softening temperature of said adhesive and said softening point of said plasticizer until said fused film becomes tacky, and applying to the resulting tacky cooled film a modifying substance comprising essentially the same said specific plasticizer in finely divided solid form while maintaining said film at said lower temperature to cause substantially immediate setting of said tacky film to nontacky condition.

12. In a method of producing a thermoplastic adhesive film characterized by nontackiness at room temperature and by the property of becoming tacky upon heating thereof to a predetermined softening temperature higher than room temperature and remaining tacky for a substantial time interval following subsequent cooling to below said softening temperature, the steps of forming a dispersion comprising as the essential constituents thereof a dispersion medium and a major proportion of a thermoplastic resin and a specific thermoplastic plasticizer each having softening points higher than room temperature, applying a film of said dispersion to a supporting surface, heating said film to a temperature higher than said softening temperature of said adhesive until said dispersion medium has been eliminated therefrom and said resin and said plasticizer are fused together, cooling said fused film to a lower temperature below said softening temperature of said adhesive and said softening point of said plasticizer until said fused film becomes tacky, and applying to the resulting tacky cooled film a modifying substance comprising essentially the same said specific plasticizer in finely divided solid form while maintaining said film at said lower temperature to cause substantially immediate setting of said tacky film to nontacky condition.

References Cited in the file of this patent

UNITED STATES PATENTS

| Number | Name | Date |
|---|---|---|
| 2,130,605 | Staude | Sept. 20, 1938 |
| 2,147,757 | Schneider | Feb. 21, 1939 |
| 2,159,151 | Hershberger | May 23, 1939 |
| 2,261,782 | Staude | Nov. 4, 1941 |
| 2,265,173 | Kauppi et al. | Dec. 9, 1941 |
| 2,332,219 | Hershberger | Oct. 18, 1943 |
| 2,343,735 | Baskin | Mar. 7, 1944 |
| 2,349,445 | McGrane | May 23, 1944 |
| 2,385,879 | Patton | Oct. 2, 1945 |
| 2,462,029 | Perry | Feb. 15, 1949 |